(12) United States Patent
Crawford

(10) Patent No.: US 11,285,349 B1
(45) Date of Patent: Mar. 29, 2022

(54) SPRINKLER SYSTEM ANTIFREEZE COMPOSITIONS AND METHODS

(71) Applicant: TFS Holdings, LLC, Lakewood, CO (US)

(72) Inventor: A. Brenton Crawford, Lakewood, CO (US)

(73) Assignee: TFS HOLDINGS, LLC, Lakewood, CO (US)

( * ) Notice: Subject to any disclaimer, the term of this patent is extended or adjusted under 35 U.S.C. 154(b) by 0 days.

(21) Appl. No.: 17/064,656

(22) Filed: Oct. 7, 2020

Related U.S. Application Data

(60) Provisional application No. 62/911,398, filed on Oct. 7, 2019.

(51) Int. Cl.
| | | |
|---|---|---|
| *A62D 1/00* | (2006.01) | |
| *A62C 2/08* | (2006.01) | |
| *A62C 35/60* | (2006.01) | |
| *A62C 35/58* | (2006.01) | |
| *C09K 15/02* | (2006.01) | |
| *C09K 3/18* | (2006.01) | |

(52) U.S. Cl.
CPC ............ *A62D 1/0035* (2013.01); *A62C 35/58* (2013.01); *C09K 3/18* (2013.01); *C09K 15/02* (2013.01)

(58) Field of Classification Search
None
See application file for complete search history.

(56) References Cited

U.S. PATENT DOCUMENTS

| | | | | |
|---|---|---|---|---|
| 2,147,409 A | * | 2/1939 | Lamprey | C09K 5/20 252/72 |
| 3,274,105 A | * | 9/1966 | Mevel | A62D 1/0035 252/2 |
| 8,366,955 B2 | * | 2/2013 | Thomas | A62D 1/0035 252/3 |
| 10,046,191 B1 | * | 8/2018 | Hernandez | C09K 5/20 |
| 11,110,311 B2 | * | 9/2021 | Hernandez | A62C 3/004 |
| 2002/0065320 A1 | * | 5/2002 | Messadek | A61P 9/10 514/561 |
| 2006/0163528 A1 | * | 7/2006 | Wenderoth | C09K 5/20 252/73 |
| 2009/0250654 A1 | * | 10/2009 | Lievens | C09K 3/185 252/75 |
| 2009/0286881 A1 | * | 11/2009 | Messadek | A61K 45/06 514/563 |
| 2010/0087394 A1 | * | 4/2010 | Twydell | A61K 8/63 514/63 |
| 2010/0330174 A1 | * | 12/2010 | Messadek | A61P 29/00 424/464 |
| 2013/0005683 A1 | * | 1/2013 | Messadek | A61K 31/205 514/56 |
| 2013/0207025 A1 | * | 8/2013 | Sapienza | C09K 3/18 252/70 |
| 2014/0138105 A1 | * | 5/2014 | Kuwatch | A62D 1/0042 169/46 |
| 2015/0293110 A1 | * | 10/2015 | Lundquist | C12Q 1/28 435/7.92 |
| 2018/0016457 A1 | * | 1/2018 | Haga | B43K 8/00 |
| 2019/0375975 A1 | * | 12/2019 | Tria | C09K 8/04 |
| 2020/0101340 A1 | * | 4/2020 | Worsman | A62D 1/0035 |

* cited by examiner

*Primary Examiner* — Joseph D Anthony

(57) ABSTRACT

An antifreeze composition and a sprinkler system containing the antifreeze composition are described. Examples include aqueous antifreeze compositions containing relatively low amounts of glycerin and/or glycols, and which further include additives that are relatively non-flammable compared to glycerin and glycols. The additives are generally compatible with each other in the antifreeze compositions. Examples of the antifreeze compositions are typically relatively non-flammable, have low electrical conductivity and low corrosivity, and are compatible with CPVC.

4 Claims, 1 Drawing Sheet

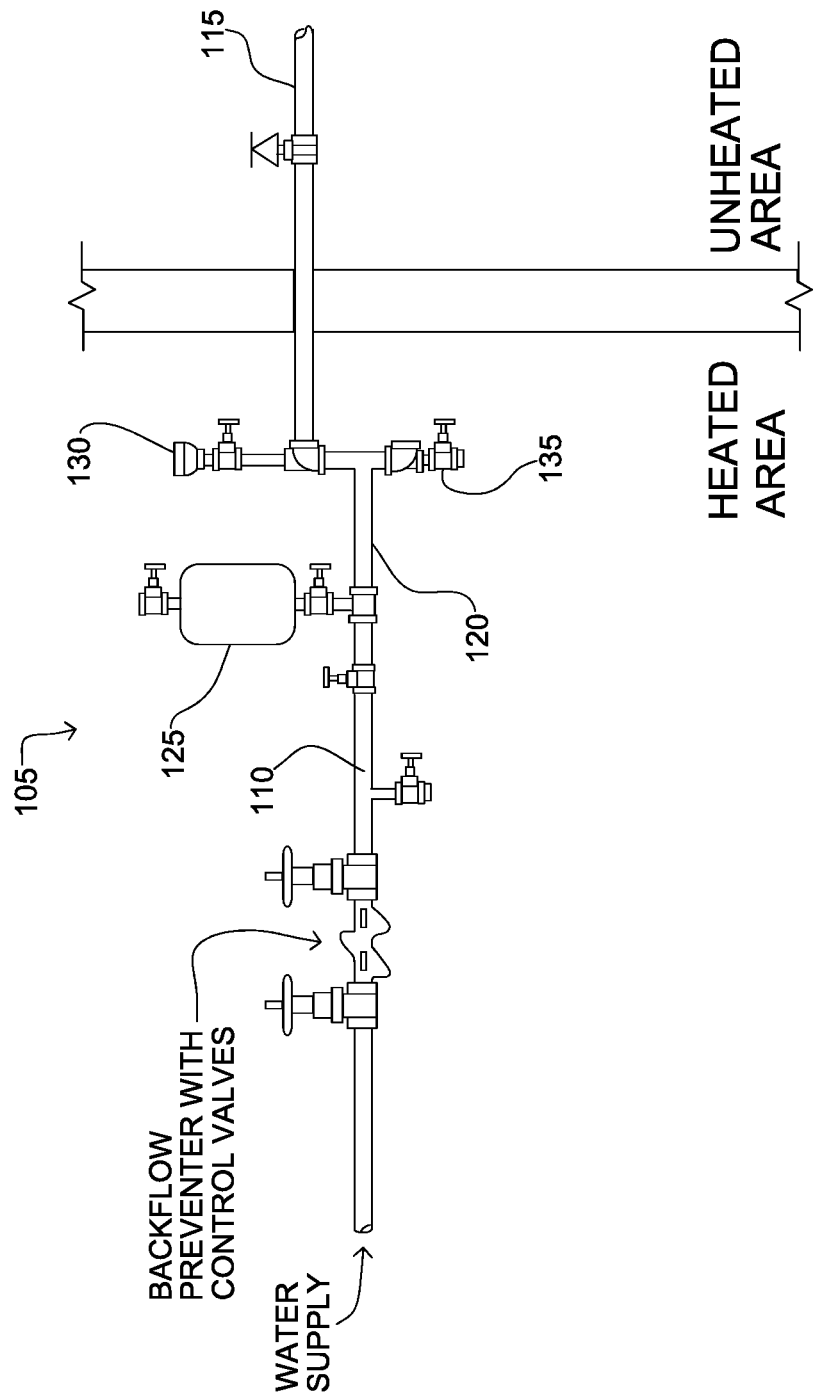

SPRINKLER SYSTEM ANTIFREEZE COMPOSITIONS AND METHODS

RELATED APPLICATION

The present application claims priority to and incorporates by reference U.S. provisional application No. 62/911,398, filed Oct. 7, 2019, titled SPRINKLER SYSTEM ANTIFREEZE COMPOSITIONS AND METHODS.

FIELD OF THE INVENTION

The present invention relates generally to systems, compositions, and methods for preventing freezing in building sprinkler systems.

BACKGROUND

Building sprinkler fire suppression systems (sprinkler systems) can be susceptible to freezing of water or aqueous compositions contained in the systems. Such freezing typically renders the system inoperable while the water is frozen, and can cause severe damage to the system that persists after thawing. Accordingly, glycerin or glycols (typically propylene glycol; sometimes ethylene glycol) have frequently been used as antifreeze to lower the freezing point of aqueous compositions in the sprinkler systems. Due to incompatibility of some glycols with chlorinated polyvinylchloride (CPVC), glycerin is most commonly used in sprinkler system antifreeze compositions; most residential sprinkler systems use CPVC pipe.

However, glycerin and glycols are flammable. When a building sprinkler system is first activated, aqueous compositions with substantial glycerin or glycol concentrations can create a flash as the glycerin/glycol-water mixture sprays onto a fire and the glycerin/glycol burn. The flash can be immediately dangerous and make the fire subsequently more difficult to control. Glycerin or glycol can also increase smoke production when sprayed on a fire.

Salts or other solids dissolved in water can lower the freezing point of the resulting solution, and many salts are non-flammable. However, aqueous salt solutions can be corrosive to metal building sprinkler system components, making the salt solutions incompatible with the sprinklers. Moreover, salts or other dissolved solids can make an aqueous composition sufficiently electrically conductive that the composition is unsuitable or undesirable for use in sprinkler systems. Accordingly, a non-corrosive, non-flammable aqueous antifreeze composition, which also exhibits low electrical conductivity, is needed for use in building sprinkler systems.

BRIEF DESCRIPTION OF THE DRAWINGS

FIG. 1 is a side view of a wet pipe sprinkler system including a sprinkler system antifreeze composition according to an embodiment.

DETAILED DESCRIPTION

Embodiments of the present invention include aqueous compositions comprising additives that are relatively non-flammable compared to glycerin and/or glycols. The additives are typically, but not necessarily, dissolved solids, and may include chelators, organic or inorganic salts, buffers, corrosion inhibitors, or betaines.

Only select combinations of water and additives result in aqueous compositions that have sufficient compatibility with each other, compatibility with CPVC, low electrical conductivity, and low corrosivity, to make effective sprinkler antifreeze compositions. Embodiments of sprinkler antifreeze compositions according to the present invention may have less than 38% glycerin by volume. Some embodiments have less than 35% glycerin by volume and some other embodiments have less than 30% glycerin by volume. Still other embodiments have less than 10% glycerin by volume and some embodiments have less than 1% glycerin by volume. Some embodiments have no appreciable glycerin (i.e., less than 0.1% by volume).

Embodiments of sprinkler antifreeze compositions according to the present invention may have less than 30% by volume glycol (such as propylene glycol or ethylene glycol). Some embodiments have less than 10% glycol by volume, and still other embodiments have less than 1% glycol by volume. Some embodiments have no appreciable glycol (i.e., less than 0.1% glycol by volume).

Embodiments of sprinkler antifreeze compositions according to the present invention may have electrical conductivity that is less than 7000 microSiemens per centimeter (0/cm), and some embodiments have less than 4000 µS/cm. Electrical conductivity above 7000 µS/cm is generally can be considered undesirable, and may be unacceptable in some sprinkler system applications. Lower electrical conductivity is generally preferable. For purposes of the present disclosure, electrical conductivity is for antifreeze compositions at 68° F. to 77° F. (20° C. to 25° C.).

Embodiments of sprinkler antifreeze compositions according to the present invention may have a corrosion rate less than 5.00 mils per year (mpy), some embodiments may have a corrosion rate less than 1.00 mpy, and some embodiments have a corrosion rate less than 0.50 mpy. For purposes of the present disclosure, corrosion is tested by ASTM G1-03(2017)e1.

Embodiments of sprinkler antifreeze compositions according to the present invention may be compatible with chlorinated polyvinyl chloride (CPVC). Some embodiments may be compatible with crosslinked polyethylene (PEX).

Embodiments of sprinkler antifreeze compositions according to the present invention may have a freezing point of less than or equal to −10° F. (−23.3° C.). Some embodiments have a freezing point less than −20° F. (−28.9° C.), and other embodiments have a freezing point less than −30° F. (−34.4° C.). Still other embodiments have a freezing point less than −35° F. (−37.2° C.) and some embodiments have a freezing point less than −40° F. (−40° C.).

In some embodiments, the antifreeze composition has a sufficiently low coefficient of thermal expansion that wet sprinkler systems containing the antifreeze composition do not require an expansion chamber.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

The terms "removable", "removably coupled", "removably installed," "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

Directional or relational terms such as "top," bottom," "front," "back," "above," "beneath," and "below," as used in this specification and appended claims, refer to relative positions of identified elements, components, or objects, where the components or objects are oriented in an upright position as normally installed or used.

The terms "mixture" and "mixtures," as used in this specification and appended claims, refers to heterogeneous mixtures, homogeneous mixtures, solutions, emulsions, suspensions, foams, or combination thereof.

The term "mixture," as used in this specification and appended claims, refers to a liquid combination of two or more components. The liquid combination can be a solution, heterogeneous mixture, homogeneous mixture, emulsion, suspension, or combination thereof.

Unless indicated otherwise or obviously otherwise as indicated by context, percent (%) means percent by weight (wt %). Additive wt % is based on the weight of the anhydrous version of the additive. For example, an aqueous composition that includes 0.50% sodium metasilicate could be prepared using 0.50 g anhydrous sodium metasilicate (molecular weight=122.06) per 100 g composition; alternatively 0.87 g sodium metasilicate pentahydrate (molecular weight=212.14) per 100 g composition could be used; alternatively 1.16 g sodium metasilicate nonahydrate (molecular weight 284.02) could be used.

A First Embodiment Sprinkler System Antifreeze Composition

A first embodiment sprinkler antifreeze composition includes an aqueous solution or mixture containing no detectable glycerin or glycol, and including:
  Approximately 41.6% water
  Approximately 58.4% dissolved solids apportioned as follows:
    49.9% trimethylglycine; about 4.25 moles per liter (M) trimethylglycine
    6.29% tetrasodium ethylenediaminetetraacetic acid ($Na_4EDTA$); about 0.17 M EDTA. It is thought that the EDTA may act as a chelator.
    1.81% sodium phosphate ($NaH_2PO_4$); about 0.15 M phosphate
    0.48% sodium metasilicate. It is thought that sodium metasilicate acts as a corrosion inhibitor.
    Recited percentages for dissolved solid components are percent of the composition as a whole, not percent of the dissolved solid portion.
  Total % of antifreeze composition embodiments may add up to slightly more or less than 100% due to rounding.
  The first embodiment sprinkler antifreeze composition exhibits the following properties:
    Freezing point=−42.7° F. (−41.5° C.)
    Electrical conductivity=3,500 µs/cm
    pH<9.5
    corrosion rate is less than 0.5 mils per year (mpy) for 1010 carbon steel and stainless steel; corrosion rate for brass is less than 1.0 mpy.
    compatible with CPVC; accordingly, the first embodiment sprinkler system antifreeze does not appreciably attack, degrade, or otherwise weaken CPVC pipe or lines.
    compatible with PEX; accordingly, the first embodiment sprinkler system antifreeze does not appreciably attack, degrade, or otherwise weaken PEX pipe or lines.

A Second Embodiment Sprinkler System Antifreeze Composition

A second embodiment sprinkler antifreeze composition includes an aqueous solution or mixture containing no detectable glycerin or glycol, and including:
  43.9% water
  56.1% dissolved solids comprising:
    51.03% trimethylglycine; about 4.3 M trimethylglycine
    4.34% tetrasodium ethylenediaminetetraacetic acid ($Na_4EDTA$); about 0.11 M EDTA
    0.48% sodium phosphate ($NaH_2PO_4$); about 0.04 M phosphate
    0.25% sodium metasilicate; about 0.02 M sodium metasilicate
    Recited percentages for dissolved solid components are percent of the composition as a whole, not percent of the dissolved solid portion.
Total % of antifreeze composition embodiments may add up to slightly more or less than 100% due to rounding.
  The second embodiment sprinkler antifreeze composition exhibits the following properties:
    Freezing point=−25° F. (−31.7° C.)
    Electrical conductivity=5,350 µs/cm
    pH=9.62
    corrosion rate for 1010 carbon steel=0.31 mils per year (mpy); corrosion rates for brass and stainless steel are less than 1.0 mpy.

Compatible with CPVC and PEX pipe (i.e., does not appreciably attack, degrade, or otherwise weaken CPVC pipe or PEX pipe).

A Third Embodiment Sprinkler System Antifreeze Composition

A third embodiment sprinkler antifreeze composition includes an aqueous solution or mixture of:
Approximately 43.0% water
Approximately 57.0% dissolved solids apportioned as follows:
  48.2% trimethylglycine; about 4.1 moles per liter (M) trimethylglycine
  6.50% tetrasodium ethylenediaminetetraacetic acid ($Na_4EDTA$); about 0.17 M EDTA
  1.87% sodium phosphate ($NaH_2PO_4$); about 0.15 M phosphate
  0.49% sodium metasilicate
  Recited percentages for dissolved solid components are percent of the composition as a whole, not percent of the dissolved solid portion.
Total % of antifreeze composition embodiments may add up to slightly more or less than 100% due to rounding.

The third embodiment sprinkler antifreeze composition exhibits the following properties:
Freezing point=−43° F.
Electrical conductivity=3,500 μs/cm
pH<9.5
  a corrosion rate is less than 0.5 mpy for 1010 carbon steel and stainless steel; corrosion rate for brass is less than 1.0 mpy.
  compatible with CPVC; accordingly, the third embodiment sprinkler system antifreeze does not appreciably attack, degrade, or otherwise weaken CPVC pipe or lines.
  compatible with PEX; accordingly, the third embodiment sprinkler system antifreeze does not appreciably attack, degrade, or otherwise weaken PEX pipe or lines.

A Wet Pipe Sprinkler System Including the First Embodiment Sprinkler System Antifreeze Composition A wet pipe sprinkler system 105 filled with the first embodiment antifreeze composition 110 is illustrated in FIG. 1. The wet pipe sprinkler system includes unheated pipe 115 within which resides the antifreeze composition 110. The wet pipe sprinkler system further includes heated pipe 120, an expansion chamber 125, a fill cup 130 (or other fill connection), and a drain valve 135. In some embodiments, the wet pipe sprinkler system does not include an expansion chamber.

A Method of Using the First Embodiment Antifreeze Composition

A method of using an antifreeze composition includes a pumping or pouring the first embodiment antifreeze composition into a wet pipe sprinkler system. The sprinkler system typically includes pipes in a heated space of a building and pipes in an unheated or inadequately heated space of the building.

Alternative Embodiments and Variations

The various embodiments and variations thereof, illustrated in the accompanying FIGURES and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For example in some alternative embodiments anti-corrosives include, but are not limited to, potassium sorbate, FSS Proguard CPVC Corrosions and Bacterial Inhibitor, AquaKleen RP700, Potter Pipe Shield and others.

I claim:

1. A building sprinkler system including an antifreeze composition the antifreeze composition comprising:
  at least 35% by weight water;
  at least 40% by weight dissolved solids; and
  less than 20% by volume combined concentration of glycerin and glycol;
wherein the antifreeze solution (i) has a freezing point below −10° F., (ii) has a corrosion rate for 1010 carbon steel less than 1.0 mils per year (mpy), (iii) has electrical conductivity less than 7000 microSeimens per centimeter (μS/cm), and (iv) is compatible with chlorinated polyvinyl chloride (CPCV) pipe.

2. The building sprinkler system of claim 1, wherein:
  the combined concentration of glycerin and glycol in the antifreeze composition is less than 1% by volume; and
  the freezing point of the antifreeze composition is below −30° F.

3. The building sprinkler system of claim 1, wherein:
  the combined concentration of glycerin and glycol in the antifreeze composition is less than 1% by volume;
  the dissolved solids are present in the antifreeze composition at greater than 50% by weight;
  the dissolved solids include trimethylglycine, the trimethylglycine being present in the antifreeze composition at greater than 45% by weight; and
  the freezing point of the antifreeze composition is below −20° F.

4. The building sprinkler system of claim 2, wherein the system does not include an expansion chamber.

* * * * *